(12) United States Patent  
Simon et al.

(10) Patent No.: US 11,042,475 B2  
(45) Date of Patent: Jun. 22, 2021

(54) SYSTEMS AND METHODS FOR USE IN CERTIFYING INTERACTIONS WITH HOSTED SERVICES

(71) Applicant: MASTERCARD INTERNATIONAL INCORPORATED, Purchase, NY (US)

(72) Inventors: Kathy Ann Simon, St. Peters, MO (US); Mark A. Casper, Wentzville, MO (US); Melanie F. Labbez, St. Peters, MO (US); Courtney Brown, Ballwin, MO (US); Michelle Lynn Mennemeyer, Troy, MO (US); Diane Barnes, Florissant, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 337 days.

(21) Appl. No.: 15/846,275

(22) Filed: Dec. 19, 2017

(65) Prior Publication Data

US 2019/0188121 A1 Jun. 20, 2019

(51) Int. Cl.  
*G06F 11/36* (2006.01)

(52) U.S. Cl.  
CPC ...... *G06F 11/3692* (2013.01); *G06F 11/3664* (2013.01); *G06F 11/3684* (2013.01); *G06F 11/3688* (2013.01)

(58) Field of Classification Search  
CPC ............. G06F 11/3438; G06F 11/3692; G06F 11/3664; G06F 11/3684; G06F 11/3688  
See application file for complete search history.

(56) References Cited

U.S. PATENT DOCUMENTS

| 8,677,308 | B2* | 3/2014 | Hopkins | G06F 8/30 |
| | | | | 709/223 |
| 10,127,141 | B2* | 11/2018 | Kalyanasundram | |
| | | | | G06F 11/3672 |
| 10,223,239 | B1* | 3/2019 | Ghanbaran | G06F 11/3672 |
| 2004/0210866 | A1* | 10/2004 | Friedman | G06F 11/3688 |
| | | | | 717/106 |
| 2007/0277152 | A1* | 11/2007 | Srinivasan | G06F 9/546 |
| | | | | 717/119 |
| 2007/0277154 | A1* | 11/2007 | Badwe | G06F 11/3688 |
| | | | | 717/124 |

(Continued)

*Primary Examiner* — Kamini B Patel  
(74) *Attorney, Agent, or Firm* — Harness, Dickey & Pierce, P.L.C.

(57) ABSTRACT

Systems and methods are provided for validating customer use of application programming interfaces (APIs). An exemplary method includes selecting an API defining at least one service to be used by a customer and a standard associated with the API for data payloads directed to the API, and identifying the customer. The method also includes selecting at least one test case for the API and the customer, bundling the test case(s) into a test project for the customer, and transmitting the test project to the customer whereby the customer is able to execute the test project. The method further includes monitoring data payloads between the API and the customer and compiling a report indicative of a result of the test case(s) where the report indicates whether the data payloads are compliant with the standard associated with the API and whether the customer is certified to use the API, or not.

20 Claims, 4 Drawing Sheets

(56) References Cited

U.S. PATENT DOCUMENTS

| | | | |
|---|---|---|---|
| 2007/0294586 A1* | 12/2007 | Parvathy | G06F 11/3672 |
| | | | 714/38.14 |
| 2011/0016454 A1* | 1/2011 | Paintai | G06F 11/3664 |
| | | | 717/127 |
| 2011/0264961 A1* | 10/2011 | Hong | H04L 43/50 |
| | | | 714/38.1 |
| 2015/0242304 A1* | 8/2015 | Akbulut | G06F 3/04842 |
| | | | 714/38.1 |
| 2015/0378828 A1* | 12/2015 | Moncelle | G06F 16/21 |
| | | | 707/640 |
| 2016/0140026 A1* | 5/2016 | Evans | G06F 8/34 |
| | | | 714/38.1 |
| 2016/0188450 A1* | 6/2016 | Appusamy | G06F 11/3664 |
| | | | 714/38.1 |
| 2017/0046253 A1* | 2/2017 | Ganda | G06F 11/3688 |

* cited by examiner

API Certification Engine-Project Dashboard

402 →

Project Number-CIS-2017-####   Project Status: In progress
MC Contact-Jane Smith
API-Money Send
Customer Partner Reference ID-####
Customer API Client ID-####
Customer Contact-Mike Smith Test cases Status

| 14 | of | 30 | Passed |
|----|----|----|--------|
| 2  | of | 30 | Failed |
| 14 | of | 30 | not tested |

Percentage bar: 54%

Payload logs
https:\\logs.project.customer

[Begin/continue Certification] [Generate Completion letter] [Export] [Exit Project]

Today's activity overview
API Connection at 09:34 Successful
Test case 2 executed at 09:35-Successful
Test case 3 executed at 09:37-Failed-Statement descriptor=null
Test case 3 executed at 09:43-Successful
Test case 4 executed at 09:45-Failed-Invalid Card length
API Connection at 13:00

Project notes/comments (visible by all users)
MM/DD/YY(Jane)-I wasn't able to connect to the API, unable to test
MM/DD/YY(Mike)-Resolved connection issues, Jane was able to connect

API Certification Engine-User's Homepage

404 →

User ID-ms@customer.com
Open projects and status

| CIS-2017-56789 | 0% completed | Not started |
| CIS-2017-123456 | 53% completed | Open |
| CIS-2017-234567 | 100% completed | Closed |

API Certification Engine-Payment Network User's Homepage

406 →

User ID-Jane.Smith@payment_network.com
Select API Money send

410
[Create Project]

[View API specifications/examples] [Export] [Exit Project]

API Certification Engine-Payment Network Project creation page

408 →

User ID-Jane.Smith@payment_network.com
Project Number-(created at time of saving a project)

Product Services
Disbursements          ☑ Check Box 2
Person to Person       ☐ Check Box 2
Address Validation Services  ☐ Check Box 2
Account Mapping        ☑ Check Box 2
Parameter Management   ☑ Check Box 2
LightBox               ☐ Check Box 2
Custom Test plan       ☑ Check Box 2
Additional Test Cases (Customer provided)  ☐ Check Box 2

[Save/Send Project details] [Export test cases] [Review project details] [Exit Project]

Project Status  Not Started

FIG. 4

SYSTEMS AND METHODS FOR USE IN CERTIFYING INTERACTIONS WITH HOSTED SERVICES

FIELD

The present disclosure generally relates to systems and methods for use in certifying interactions with hosted services, and in particular, to systems and methods for validating use of one or more application programming interfaces (APIs) (broadly, hosted services), by users, based on data payloads between the APIs and the users.

BACKGROUND

This section provides background information related to the present disclosure which is not necessarily prior art.

Different entities often provide services to other entities (or customers). The services may include physical services, in which the entities perform the services at a location associated with the customers. Alternatively, the services may include electronic services, whereby the electronic services may be performed at the customer locations or remote therefrom. When the services are performed remotely from the customers, the entities provide the electronic services through one or more different mechanisms, for example, one or more network-based mechanisms. An example of such a mechanism includes an application programming interface, or API. In connection therewith, the entity providing the API service (often referred to as a host) provides specific instructions to the customer so that the customer may interact with the API and receive intended benefits of the API service. Because errant interactions may cause issues not only for the customer but also for the host and/or other entities associated with the API service, in some instances the host may require that the customer be certified for use of the API service prior to the customer being granted full access thereto (e.g., via a production environment, etc.).

DRAWINGS

The drawings described herein are for illustrative purposes only of selected embodiments and not all possible implementations, and are not intended to limit the scope of the present disclosure.

FIG. 4 illustrates an exemplary interface that may be used in the system of FIG. 1 and/or the method of FIG. 3 to provide interactions between customers and one or more hosted services.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Services may be provided to customers in various of manners, including, for example, through application programming interfaces, or APIs. When customers utilize APIs, the customers are typically instructed as to the proper interaction with (or use of) the APIs, so that services performed by the APIs are performed correctly and any resulting output is accurate/proper. When the APIs are misused, or used improperly, the underlying services may generate unexpected or incorrect data outputs. As such, entities providing the APIs, such as payment networks, etc., often require the customers to be certified in their use of the APIs prior to granting permission to the customers for full and/or unfettered use of the APIs. Uniquely, the systems and methods herein allow for validating and/or certifying customers in their use of one or more APIs, through monitoring of data payloads between the customers and the API(s). In particular, a certification engine is provided between a customer and an API (for example, hosted by a payment network), to monitor the data flow (or data payloads) between the customer and the API. In connection therewith, the certification engine provides a test project for the customer and the API, which includes one or more test cases. When the test case(s) is (are) performed, through interactions between the customer and the API, the certification engine monitors the data flow there between. Then, based on the data flow, the certification engine determines if corresponding data payloads are compliant with one or more standards associated with the API or are otherwise consistent with the expectancy of the test case(s), to thereby certify that the test case(s) is (are) completed, or not. The certification engine further provides real time or near real time feedback to the customer and/or the API host (e.g., the payment network, etc.) to promote efficiencies in the validation and/or certification of the customer for the API. In this manner, the API host may provide consistent and efficient certification of the customer for use of the API. Real time, for example, may include providing feedback to the customer and/or API host immediately after or within a few seconds of the user performing a test case (e.g., within about one second, within about three seconds, within about five seconds, within about ten seconds, within about thirty seconds, within about one minute, etc.), and near real time may include providing feedback to the customer and/or API host within a later time of the customer performing at test case, but still within about a minute, about two minutes, about five minutes, or about 30 minutes, etc.

Figure 1:
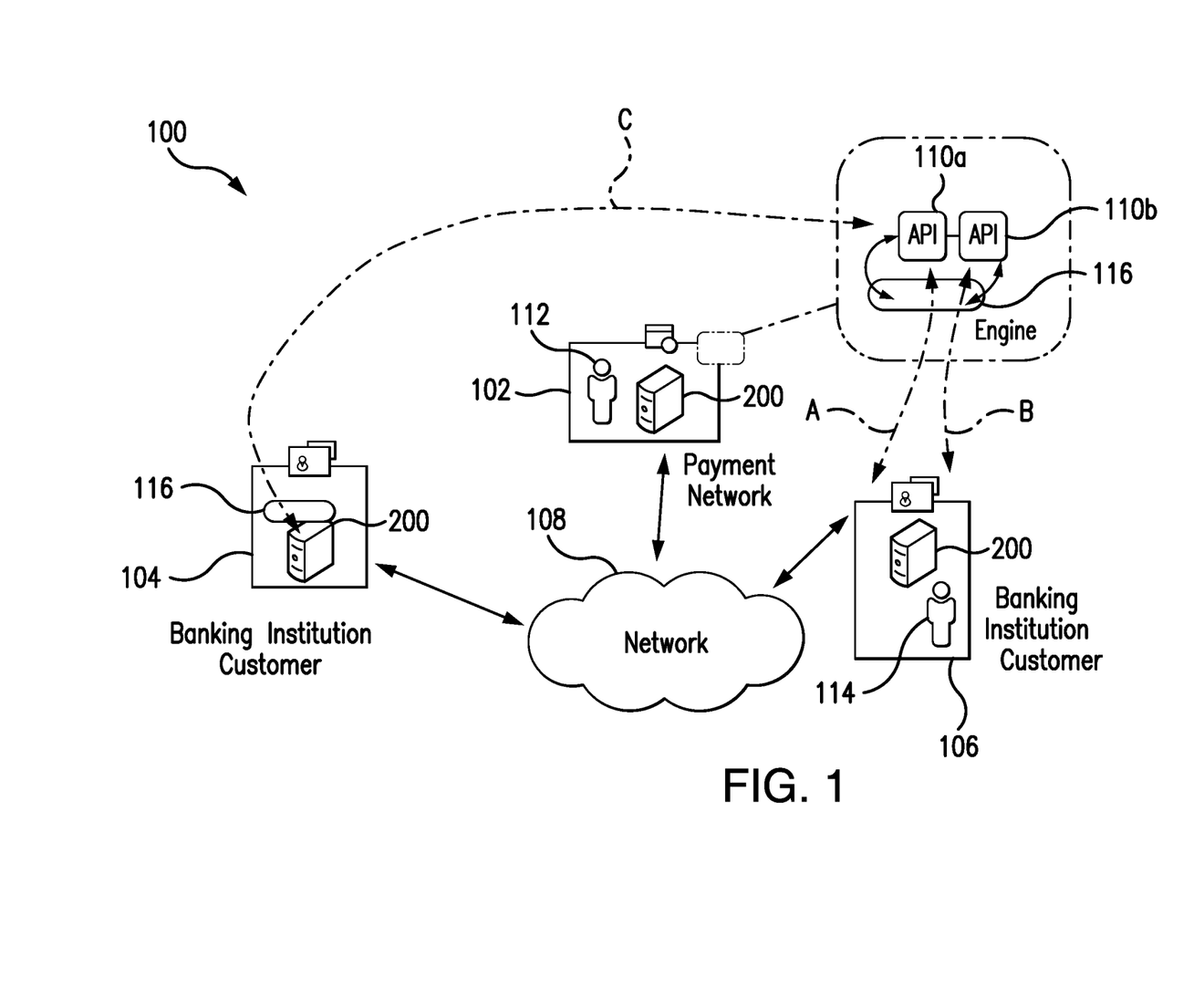
FIG. 1 illustrates an exemplary system for use in certifying interactions with one or more hosted services, and including one or more aspects of the present disclosure.

FIG. 1 illustrates an exemplary system 100, in which one or more aspects of the present disclosure may be implemented. Although parts of the system 100 are presented in one arrangement, other embodiments may include the same or different parts arranged otherwise, depending, for example, on applications and/or services involved therein, data warehouses available for access, etc.

The illustrated system 100 generally includes a payment network 102 and customers 104 and 106, each coupled to network 108. The network 108 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, the network 108 includes multiple networks, where different ones of the multiple networks are accessible to different ones of the illustrated components in FIG. 1. In particular, the payment network 102 and the customer 104 may be connected via a private network for processing transactions and, separately, the payment network 102 may be connected to the customer 106 through a public network, such as the Internet.

Generally in the system 100, the customers 104 and 106 are financial institutions, such as banks, which provide financial services related to banking, lending, insurance, investments, etc. The customers 104 and 106 may therefore rely on certain data from the payment network 102 to make business decisions or other decisions related to those financial services and/or to carry out financial transactions or processes related to the financial services that the customers 104 and 106 provide. The customers 104 and 106 may also rely on certain services offered by the payment network 102 to make such decisions and/or to carry out such financial transactions and processes. With that said, while the customers 104 and 106 are described as financial institutions herein, it should be appreciated that the customers 104 and 106 may include any type of entity, institution, person, etc., which may request and/or rely on data from, or services offered by, the payment network 102 (or another entity associated therewith, etc.). What's more, while described as implemented in the payment network 102, the present disclosure should not be understood to be limited to the payment network 102, or to payment networks in general, as other entities may be included in the system 100 in other system embodiments (such that the various features described herein with regard to the payment network 102 are also applicable to the other entities). With that said, in general, the present disclosure is applicable to entities that maintain data warehouses and provide reports from the data warehouses, either internally or externally, to customers thereof or other interested entities.

The payment network 102 of the illustrated system 100 generally includes multiple application programming interfaces (APIs), such as APIs 110a and 110b. Each of the APIs 110a and 110b is illustrated as being separate from the other one of the APIs 110a and 110b. However, it should be appreciated that the APIs 110a and 110b may be hosted by and/or present on the same computing device, or segregated to separate and/or multiple separate computing devices as desired. In addition, the APIs 110a and 110b are internal to the payment network 102 in this exemplary embodiment, while, in other embodiments, the APIs 110a and 110b may be external, in whole or in part, to the payment network 102.

As part of its business and/or support of its customers 104 and 106, for example, the payment network 102 may offer a number of operations and/or services to the customers 104 and 106. The services may be made available to the customers 104 and 106 in one or more manners, including, specifically, through the APIs 110a and 110b. The services underlying the APIs 110a and 110b may be generally simple in nature, for example, the retrieval of or the check on specific data, or they may be more complex, for example, relating to a payment account transaction, etc. As an example, one or both of the APIs 110a and 110b may be associated with a service of providing rich information about a given merchant to one or both of the customers 104 and 106 (e.g., where one or both of the customers 104 and 106 may include an acquirer or issuer, etc.). As another example, one or both of the APIs 110a and 110b may provide a money send service to one or both of the customers 104 and 106, whereby the customers 104 and 106 are permitted to send money, digitally, either domestically or cross-border. As yet another example, one or both of the APIs 110a and 110b may include a predictive, behavior-based fraud score service, which permits one or both of the customers 104 and 106 to determine whether or not to permit transactions to proceed (e.g., where one or both of the customers 104 and 106 include an issuer of payment accounts, etc.).

In still further aspects of the present disclosure, one or both of the APIs 110a and 110b associated with the payment network 102 may be associated with (without limitation) services related to: commercial real estate and about offering insights to the monthly performance of retail locations to help evaluate acquisitions, optimize rents, and validate conclusions; accepting e-commerce and mobile commerce payments, regardless of payment brand; monitoring spending by transaction amount, transaction type (e.g., transactions involving point-of-sale (POS) devices, Internet transactions, etc.) and home country, and also to the temporary suspension of cards to prevent unauthorized use; cardholders for managing how, when and where their cards are being used by setting decline and alert rules (e.g., based on transaction amounts, transaction types, home countries, etc.) and personalized alerts; allowing addition of funds to eligible prepaid accounts; providing offers to account holders based on their payment account transactions to drive increased account usage and account holder engagement; multi-channel global payment processing; advanced fraud prevention and risk management solutions for merchants and financial institutions; moving funds between accounts and sending disbursements; developing cloud-based payment (CBP) (e.g., Mastercard CBP (MCBP)) applications; measuring impact of digital media campaigns on online and offline sales; providing tokenization of account numbers for increased payment security; identifying potentially high-risk merchants before entering into a merchant agreements; providing consumer-initiated mobile payment solutions that enable consumers to make convenient, secure payments for everyday purchases; providing simplified checkout experiences with digital wallets; accessing trend and sales data at industry and micro-sector levels; identifying payment cards that have been reported lost or stolen by issuers; providing global database access; providing predictive, behavior-based fraud score tools for e-commerce merchants; determining beneficial audiences for advertising in order to maximize the impact of ad marketing spend; and providing assurances that consumers are transacting digitally using genuine attributes; etc.

With that said, in general herein, the APIs 110a and 110b may be provided by the payment network 102 to perform various services and/or operations, as needed or desired, by the customers 104 and 106 (and/or by other customers in the system 100). And, the services provided may include any suitable services and/or operations (e.g., any one or more of the services described above, other services, etc.).

With continued reference to FIG. 1, the payment network 102 includes a user 112 involved in providing permissions for and management and/or onboarding of one or more of the customers 104 and 106 for the APIs 110a and 110b. The user 112 may include, without limitation, an employee, a manager, etc. associated with the payment network 102, or a contractor associated therewith. In addition herein, the customer 106 is associated with a user 114, who may be, without limitation, an employee, a manager, etc., associated with integration, set up, and/or management of the customer's use of one or more of the APIs 110a and 110b, etc. Each of the users 112 and 114 is associated with a computing device 200 at the respective one of the payment network 102 and the customer 106, and which will be described in more detail hereinafter.

The payment network 102 further includes a certification engine 116, which is configured, by executable instructions, to operate as described herein. In general, prior to the customers 104 and 106 using one or more of the APIs 110a and 110b in a production or live environment, the customers 104 and 106 are required, in this embodiment, to utilize and/or demonstrate use of the APIs 110a and 110b in a test environment. In connection therewith, the certification engine 116 is configured to provide the certification of the customers 104 and 106, in the test environment, based, for example, on a test project and/or one or more test cases involving the APIs 110a and 110b.

In the illustrated embodiment, the certification engine 116 is provided as a standalone part of the payment network 102 (e.g., as a standalone computing device associated with the payment network 102, etc.), and is partially located in communication with the payment network 102 and partially located at the customer 104. However, in other embodiments of the system 100 the certification engine 116 may be included or incorporated in computing device 200 of the payment network 102 (fully or partially). What's more, in still other implementations of the present disclosure the certification engine 116 may be included (in whole or in part) with one or more of the APIs 110a and 110b, or with other applications, programs or services provided by and/or included in the payment network 102, other entities of the system 100, etc. (such that the certification engine 116 may then be associated with and/or incorporated in a computing device associated therewith).

In addition in the illustrated embodiment of FIG. 1, the certification engine 116 is generally configured to monitor data flow between customers 104 and 106 and APIs 110a and 110b based on logs for APIs 110a and 110b (e.g., by parsing the logs, etc.), which are accessible to the certification engine 116. The logs may be accessible, for example, via a URL associated with the APIs 110a and 110b and/or associated logs (or in any other manner). In this embodiment, the logs for APIs 110a and 110b contain, for example, various details regarding the data flow between customers 104 and 106 and the APIs 110a and 110b, for example, relating to: the customer 104 or 106 (and/or the associated user 112 or 114) making a request or call to the API 110a or 110b; a service and/or function associated with the API 110a or 110b being requested or called; the parameters passed for the given request or call associated with the API 110a or 110b; the results returned from the request or call; any errors associated with such request or call; timing (associated with any of the foregoing); etc. In connection therewith, the certification engine 116 may be located (logically or physically) entirely at the payment network 102, or the certification engine 116 may be located in whole or in part at one or both of the customers 104 and 106 (remote from the payment network 102) (such as in the illustrated embodiment where the certification engine 116 is located in part in association with the payment network 102 and in part at the customer 104), or elsewhere. But regardless of location, as indicated above, the certification engine 116 is located so that it can examine data flow between customers 104 and 106 and APIs 110a and 110b based on logs for APIs 110a and 110b.

With that said, the certification engine 116 is generally configured, and disposed (logically or physically), between APIs 110a and 110b and the customers 104 and 106, such that data flow between customers 104 and 106 and APIs 110 and 110b passes through the certification engine 116, whereby the certification engine 116 is configured to monitor the data flow in real time (or near real time) as it is passed between customers 104 and 106 and APIs 110a and 110b (real time, for example, may include monitoring data flow between the customers and the APIs immediately as the data flows, or within a few seconds of the data flowing, therebetween (e.g., within about one second, within about three seconds, within about five seconds, within about ten seconds, within about thirty seconds, within about one minute, etc.), and near real time may include monitoring data flow between the customers 104 and 106 and the APIs 110a and 110b within a later time of the data flow passing therebetween, but still within about a minute, about two minutes, about five minutes, or about 30 minutes, etc. In particular in FIG. 1, and as discussed above, the certification engine 116 is located at least partly at the payment network 102 and disposed generally between the APIs 110a and 110b and the customer 106, such that the certification engine 116 may be configured so that data flowing between the customer 106 and the API 110a (data flow A) and data flowing between the customer 106 and the API 110b (data flow B) passes generally through the certification engine 116 associated with the payment network 102. In addition in FIG. 1, the certification engine 116 is located at least partly at the customer 104 and disposed generally between the API 110a and the customer 104, such that the certification engine 116 may be configured to also have data flowing between the customer 104 and the API 110a (data flow C) to pass generally through the certification engine 116.

The certification engine 116 is also configured, in the illustrated embodiment, with one or more test cases for each of APIs 110a and 110b. The certification engine 116, then, and as discussed in more detail below, is configured to monitor particular data passed between the customers 104 and 106 and the APIs 110a and 110b (e.g., parameters for a particular API request and/or a result returned by the API 110a in response to that request, etc.), to identify data applicable to the test cases, and to determine whether the data passes or fails the test case.

In the illustrated embodiment, the certification engine 116 is generally configured to support any number of APIs and associated test cases. The certification engine 116 may, for example, be configured to allow the user 112 associated with the payment network 102 to create, at the certification engine 116, a new API association by providing details associated with the new API (e.g., name, URL for the API and/or associated log, test case(s), standard specification, etc.). In this manner, the certification engine 116 may, for example, be configured to accept a file (e.g., formatted according to a standard test case template, etc.) specifying any number of test cases and to associate those test cases with the new API. In turn, the certification engine 116 may be configured to identify the test case(s) (and their details) in the file. The certification engine 116 may, for example, be configured to identify the test cases (and their details) in the file based on the file being formatted in accordance with a standard template (e.g., where a row for each test case includes a test case number in a first column, a test case summary in second column, and an expected result in a third column; etc.). The file may (or may not) include any additional information regarding the test cases or associated API, such as, for example, an identification of the API service to which the test cases pertains (e.g., disbursement services, person-to-person (P2P) services, and/or address validation services for the MasterCard Send API (broadly, a Money Send API), etc.) (e.g., in a fourth column, etc.). Exemplar test case entries for various services of Money Send API are shown below in Table 1.

TABLE 1

| Test Case # | Test Case Summary | Expected Test Case Result | API Service |
|---|---|---|---|
| 1 | Transaction Amount exceeds transaction Limit (Payment Network 102) | Decline | Person to Person |
| 2 | Two transactions causing aggregate limit for a network to be exceeded (same network) | Decline second transaction | Person to Person |
| 3 | Invalid input format - Expiration date | Error | Person to Person |
| 4 | Successful transaction(Transaction routed through STAR) | Successful | Disbursements |
| 5 | Invalid Account - Card number is Invalid | Decline | Disbursements |
| 6 | Request Timeout scenario | System Error | Disbursements |
| 7 | Invalid card Type (Customer is only configured for debit but card provided is prepaid) | Decline | Disbursements |
| 8 | Account verification provided for valid card and address with 5 digit postal code | Successful Response with all fields matched | Address Verification |
| 9 | Account provided is eligible for payments. | Successful Response | Account Information |

The certification engine 116 may be configured to additionally, or alternatively, accept manual input of test case information for the new API association from the user 112 associated with the payment network 102 (e.g., via free form fields soliciting the same or similar type of information specified in the standard template, etc.).

It should also be appreciated that, when configured with the new API association, the certification engine 116 may be configured to allow the user 112 associated with the payment network 102 to specify whether custom test plans are allowed for test projects for the API (e.g., so that only a subset of the provided test cases may optionally be included in a test plan for the API, etc.) and/or whether customer-provided test cases are allowed to optionally include test projects for the API (e.g., in addition to the test cases identified in the file and/or manually input by the user 112, etc.). In any event, regardless of whether the certification engine 116 accepts test case information via a file, manual entry, or in any other manner, the certification engine 116, then, is configured to store the test cases (and their details), for example, in a data structure associated, at least in part, with the new API, etc. (e.g., in a same or similar format as a standard test case template, or another format), or in another manner. In connection therewith, the certification engine 116 may, for example, be configured to store the tests case(s) (and their details) in a data structure that has fields, for each test case, for the test case number, a test case summary, and an expected test case result, along with other information, such as, for example, "Parameter(s) to validate," where the "Parameter(s) to validate" corresponds to parameters to be passed by a customer to the API for validation by the certification engine 116 in association with a particular test case. In one example, where the API 110a is the Money Send API discussed above and the user 112 associated with the payment network 102 has uploaded a test case file consistent with Table 1 above (e.g., in configuring the certification engine 116 to associate with API 110a, etc.), the certification engine 116 may be configured to store the test cases (and their details) included therein in a data structure formatted consistently therewith. Exemplar formatting is show below in Table 2.

TABLE 2

| Test Case # | Test Case Summary | Expected Test Case Result | API Service | Parameter(s) to validate |
|---|---|---|---|---|
| 1 | Transaction Amount exceeds transaction Limit (Payment Network 102) | Decline | Person to Person | |
| 2 | Two transactions causing aggregate limit for a network to be exceeded (same network) | Decline second transaction | Person to Person | |
| 3 | Invalid input format - Expiration date | Error | Person to Person | |
| 4 | Successful transaction(Transaction routed through STAR) | Successful | Disbursements | See Table 3 |
| 5 | Invalid Account - Card number is Invalid | Decline | Disbursements | |
| 6 | Request Timeout scenario | System Error | Disbursements | |
| 7 | Invalid card Type (Customer is only configured for debit but card provided is prepaid) | Decline | Disbursements | |
| 8 | Account verification provided for valid card and address with 5 digit postal code | Successful | Address Verification | |
| 9 | Account provided is eligible for payments. | Successful Response | Account Information | See Table 4 |

It should be appreciated that the certification engine 116 may, in some embodiments, be configured to receive at least some information associated with test cases when being configured with a new API association, or at a different time. For example, with reference to Table 2, any applicable "Parameter(s) to validate" (e.g., for Test Case No. 4, the "Required" Parameters and associated requirements identified in Table 3, etc.) stored in the data structure may come from the test case file, or be manually entered, when a new API association is configured. Alternatively, any applicable "Parameter(s) to validate" may be received at another time (e.g., when a test project is created for a particular customer, etc.).

It should be appreciated that in the exemplary system 100 of FIG. 1, the certification engine 116 is configured with API associations for APIs 110a and 110b. For example, the user 112 associated with the payment network 102 has already created, at the certification engine 116, a new API association for each of APIs 110a and API 110b, consistent with the above description. In connection therewith, the certification engine 116 is configured with test cases associated with APIs 110a and 110b. In one example, where API 110a is the Money Send API discussed above, the certification engine 116 may be configured with a new connection for the Money Send API, where, for example, "Money Send" was specified as the name of the API and "paymentnetwork.com/api/moneysend/log" was specified as the URL for the API log, as well as with a test case file consistent with Table 1 above.

In operation of the system 100, when the customer 106, for example, determines that it desires and/or needs to utilize API 110a (to implement or otherwise utilize one or more services associated therewith), the customer 106 may begin an integration process, whereby the customer 106 (and specifically, the user 114 associated therewith) modifies and/or builds out its computing device 200 to push data to the API 110a (e.g., as part of a call(s) or request(s) to the API 110a, etc.) and receive data from the API 110a (e.g., a result(s) returned from the API 110a in response to the call or request, etc.) (e.g., in both cases, via data flow A in FIG. 1, etc.). In connection therewith, the user 112 associated with the payment network 102 may interact with the certification engine 116 to create a test project for the API 110a and the customer 106. Specifically, the user 112 may identify the API 110a and the customer 106 to the certification engine 116. In response, the certification engine 116 is configured to select one or more test cases (e.g., as part of the test project, etc.) to be employed to certify the customer's interaction(s) with the API 110a.

In embodiments, the certification engine 116 may be configured to automatically select all test cases associated with one or more particular service(s) offered by API 110a (e.g., all test cases associated with Disbursement services, Person-to-Person (P2P) services, and/or Address Validation Services, etc.). Alternatively, the certification engine 116 may be configured to automatically select only a subset of the test cases associated with one or more services, depending on, for example, default preferences (e.g., default customer 106 or user preferences set by user 112 when a new connection with API 110a was configured, etc.) or characteristics associated the customer 106. Once selected, the certification engine 116 may be configured to provide the user 112 an option to select additional test cases, to de-select one or more of the test cases selected by the certification engine 116 (e.g., to potentially allow the user 112 to customize certification of the customer 106 to particular services associated with the API 110a, etc.). The certification engine 116 may also be configured to provide the user 112 with an option to provide additional test cases (e.g., provided by the customer 106) (e.g., via uploading a file or free form fields (consistent with the above description), etc.).

Then, in the system 100, once the desired test case(s) is (are) selected (or de-selected), the certification engine 116 is configured to bundle the test case(s) as a test project and to transmit the test project to the customer 106, for example, via at least a link to the test project (e.g., as included in an email, etc.), etc.

In response, the user 114 associated with the customer 106 may interact with the certification engine 116, view the test project, and configure its computing device 200 to interact with the API 110a based on the test project. For example, when the test project is transmitted to the customer 106 (and in particular the user 114) via a link in an email, and when the link is executed, the certification engine 116 is configured to initially invite the user 114 to create a user profile (if the user 114 is a new user) or associate the test case with an existing user profile for the user 114, and then to provide the user 114 with the test cases bundled with that test project under that profile. The user 114 is able to access, and leave, when desired, the user profile. In addition, the certification engine 116 may be further configured to present to the user 114 an overview of the test project and/or the API 110a, a listing and/or description of one or more of the particular test cases for the API 110a to be tested, and a functionality of the API 110a being certified by the test cases (and test project). The certification engine 116 may be configured to present this information as part of the user's interaction with the certification engine 116, or separate therefrom (e.g., as a PDF, etc.). In connection therewith, broadly, the user 114 ultimately, or generally, executes the test project for the API 110a in accordance with the bundled test cases. The user profile may be associated with multiple test projects, thereby potentially allowing the user 114 to have, and monitor, test cases or projects in progress for multiple test projects and/or APIs at one or more times.

The certification engine 116, in turn, is configured to monitor data flow passing between the API 110a and the customer 106 (e.g., consistent with the above) (and specifically, data associated with each of the test case(s) for the test project). The certification engine 116, then, is further configured to determine whether the monitored data flow is in compliance with a standard specification of the API 110a, based on the expected result for one or more test cases bundled in the test project, and potentially, based on any parameters to validate for those test cases. In this manner, where the data returned by the API 110a to the customer 106 includes results associated with a particular test case, the certification engine 116 is configured to compare the returned result to the expected test case result associated with the particular test case (e.g., from API logs or data flow therebetween, etc.). For example, for a specific API, such as where API 110a is the Money Send API, the expected test case result for Test Case No. 4 referenced in Table 2 is "Successful." If the user 114 associated with customer 106 executes Test Case No. 4 in a manner that yields a returned result from API 110a indicating "Successful," the certification engine 116 is configured to determine that customer 106 passes Test Case No. 4, subject to the outcome of any parameter(s) validation for Test Case No. 4. It should be appreciated that the certification engine 116 may be configured to determine that data returned by the API 110a to the customer 106 includes a result associated with a particular test case by, for example (and without limitation), parsing (e.g., in a log for API 110a) the monitored data flow (e.g., for results returned by the API 110a to the customer 106 in response to specific requests or calls to the API that are associated with each bundled test case, etc.). In this regard, for each test case in the test project, the certification engine 116 may, for example, be configured with information corresponding to each API 110a request or call (and response thereto) associated with the test case (e.g., so that the certification engine 116 may compare the parsed data in the log for the API 110a with such information in order to determine whether the parsed data corresponds to a particular test case, etc.).

Where the data passed by the customer 106 to the API 110a includes parameters associated with a particular test case, the certification engine 116 is further configured to compare these parameters to any parameters to validate associated with the test case. For example, for a specific API, Case No. 4 referenced in Table 2, and, thus, that the data is not compliant with the standard. It should be appreciated that the certification engine 116 may be configured to determine that data passed by the customer 106 to the API 110a includes a parameter(s) associated with a particular test case by, for example (and without limitation), parsing (e.g., in a log for API 110a, etc.) the monitored data flow (e.g., for requests or calls made by the customer 106 to the API 110a that are associated with each bundled test case, etc.). In this regard, for each test case in the test project, the certification engine 116 may, for example, be configured with information corresponding to each API 110a request or call associated with the test case (e.g., so that the certification engine 116 may compare the parsed data in the log for API 110a with such information in order to determine whether the parsed data corresponds to a particular test case, etc.).

TABLE 3

| Parameter | Required | Example |
| --- | --- | --- |
| payment_disbursement<br>Contains the details of the request message. | Optional | |
| payment_disbursement.disbursement_reference<br>This is a client-specific identifier for the disbursement. It must be unique within the client's domain. Allowable characters are alphanumeric and the *,.-_ ~ characters.<br>Details- 6-40 | Required | DEF123456 |
| payment_disbursement.amount<br>The amount to be paid to the recipient in the smallest unit of the currency. Example: 100 = $1.00 (assuming USD).<br>Details- numeric, 1-999999999999 | Required | 1000 |
| payment_disbursement.currency<br>The currency of the disbursement amount as an ISO 4217 alpha-3 currency code, in uppercase. Details- alpha, 3 | Required | USD |
| payment_disbursement.recipient.first_name<br>Recipient's first name is required for non-tokenized transactions. Details- 1-40 | Required | Jane |
| payment_disbursement.recipient.middle_name<br>Recipient's middle name. Details- 1-40 | Optional | Tyler |
| payment_disbursement.recipient.last_name<br>Recipient's last name is required for non-tokenized transactions. Details- 1-40 | Required | Smith |
| payment_disbursement.recipient_account_uri<br>URI identifying recipient's account to receive the disbursement funds. Only a pan based account is valid.<br>Valid Values- Refer 'Account URIs' | Required | acct-<br>ref: ABCD123456789 | such as where the API 110a is, again, the Money Send API discussed above, a portion of the standard specification for the API involving a Money Send request is provided in Table 3 below. As shown, the Money Send request is required to include certain parameters, each of which is associated with a required designation indicating whether the parameter is required or optional, associated requirements (e.g., for the "payment_disbursement.currency" parameter, that currency is specified as an ISO 4217 alpha-3 currency code, in upper case, etc.), and, in some cases, an example that provides the format of the parameter. As such, if an API Money Send request (e.g., associated with Test Case No. 4 referenced in Table 2, etc.) does not include, for example, an appropriate disbursement currency (e.g., a disbursement currency specified as an ISO 4217 alpha-3 currency code, in upper case, etc.) within the data passed by the customer 106 to the API 110a for the request, the certification engine 116 is configured to determine that the API Money Send request fails Test In addition, as a further example, Table 2 includes another portion of the standard specification for the example Money Send API, discussed above, for an Account Information service request from the Money Send API. As shown, and as above, the Account Information request is required to include certain parameters, each of which is associated with a required designation indicating whether the parameter is required or optional, associated requirements (e.g., for the "partnerID" parameter, that partner ID is specified as a 32 character string, etc.), and, in some cases, an example that provides the format of the parameter. As such, if an API Money Send request (e.g., associated with Test Case No. 9 referenced in Table 2, etc.) does not include, for example, an appropriate partner ID (e.g., a partner ID as a 32 character string, etc.) in the data passed by the customer 106 to the API 110a for the request, the certification engine 116 is configured to determine that the API Money Send request fails Test Case No. 9 referenced in Table 2, and, thus, that the data is not compliant with the standard.

TABLE 4

| Parameter | Required | Example |
| --- | --- | --- |
| partnerId<br>Path Param - Provider assigned partner id. Details - string, 32 | Required | |
| fields<br>Query Param - A comma-delimited, order independent list of one or more of the following values: metadata - return account metadata. Default value is equivalent to "fields = metadata". Details- Required | Optional | |
| account_info<br>Contains the details of the request message. | Optional | See child attributes |
| account_info.account_uri<br>URI identifying account for which information is desired. Note: Using the Consumer Ref Account URI is not valid for this service. Only a card based account is valid. Valid Values- Refer 'Account URIs' | Required | pan: 5432123456789012;<br>exp = 2017 February;<br>cvc = 123 |
| account_info.amount<br>Intended amount to transfer. This could give more accurate information. Details- Numeric, 1-999999999999 | Optional | 1000 |
| account_info.currency<br>The currency of the amount as an ISO 4217 alpha-3 currency code, in uppercase. Currency should be provided if amount is provided. Details- Conditional, alpha, 3 | Optional | USD |
| account_info.payment_type<br>BDB: Business Disbursements, GDB: Government Disbursements, P2P: Person to Person, A2A: Account to Account, AMS: Acquirer Merchant Settlement, CBP: Credit Card Billpayment. Details- Conditional, This parameter should be defined during onboarding process. If multiple payment types are setup for a partner the right payment type corresponding to the request should be specified. | Optional | BDB |

Further, in this exemplary embodiment, the certification engine 116 is configured to provide notifications regarding test project status and/or test case results, at one or more regular or irregular intervals, or in real time (e.g., instantaneously, within milliseconds, etc.) or near real time (e.g., in a time frame resulting in no significant delays, etc.), to the user 112 and/or the user 114, at their respective computing device 200. In one embodiment, the certification engine 116 is configured to host a dashboard, for the customer 106, and specifically, for the user 114, whereby the certification engine 116 is configured to provide the notifications to the customer 106 via the dashboard.

Additionally, or alternatively, the certification engine 116 is configured to transmit notifications to the user 112, and the payment network 102, more generally. The notifications are provided to notify the user 112 of the status of the test project and/or specific test cases within the test project, etc. Such notifications may include, for example, indications that a test case was successfully executed (e.g., Test case #2 executed 09:35 MMDDYYY—successful, etc.), or that a test case failed (e.g., Test case #3 executed 15:32 MMDDYYY—fails (statement descriptor NULL), etc.), or relating to test case (or test project) connections (e.g., API connection at 09:15—Successful, API connection at 16:45—Ended, etc.). The certification engine 116 may be configured to provide the notifications, optionally, along with additional information about the test project (or other test projects) through a dashboard and/or other interface accessible to the user 114, via the user's profile with the certification engine 116.

While only one payment network 102, two customers 104 and 106, two APIs 110a and 110b, two users 114 and 112, and one certification engine 116 are illustrated in the system 100 in FIG. 1 (for ease of reference), it should be appreciated that the system 100, and/or other system embodiments of the present disclosure, may include multiple ones of one or more of these parts in various combinations (as well as one or more additional parts). For example, other system embodiments may include multiple customers, and one or more of the multiple customers may include multiple users.

Figure 2:
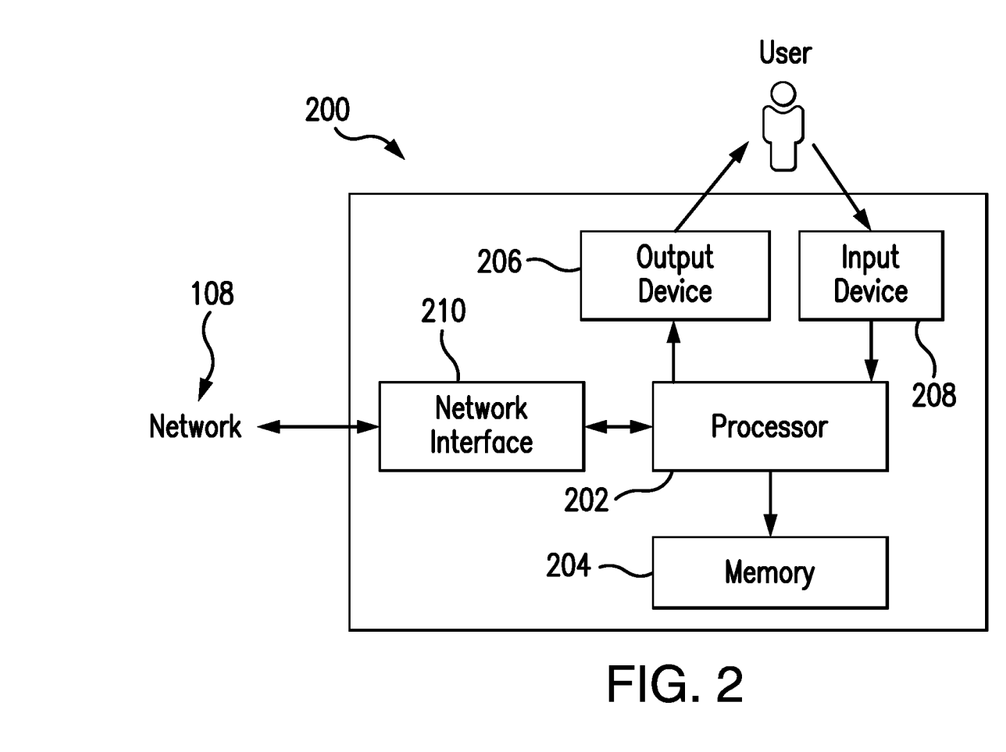
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the exemplary embodiment of FIG. 1, each of the payment network 102 and the customers 104 and 106 are illustrated as including, or being implemented in, computing device 200, coupled to the network 108. In addition, the certification engine 116 may be considered a computing device, or may be considered implemented in a computing device, consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, data specific to the service(s) provided by the APIs 110a and 110b (and other APIs), API associations, test cases, test projects, links to test projects, and/or other types of data (and/or data structures), etc. suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes an output device 206 that is coupled to (and that is in communication with) the processor 202. The output device 206 outputs information such as test cases, result notifications, etc. in real time, or near real time, etc., (e.g., as defined by the test project, etc.), visually, for example, to the user 112 and/or the user 114 of a respective one of the computing devices 200, etc. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

In addition, the computing device 200 includes an input device 208 that receives inputs from the user (i.e., user inputs) such as, for example, selections of test cases, etc. from the user 112, as further described below. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to one or more different networks, including the network 108.

Figure 3:
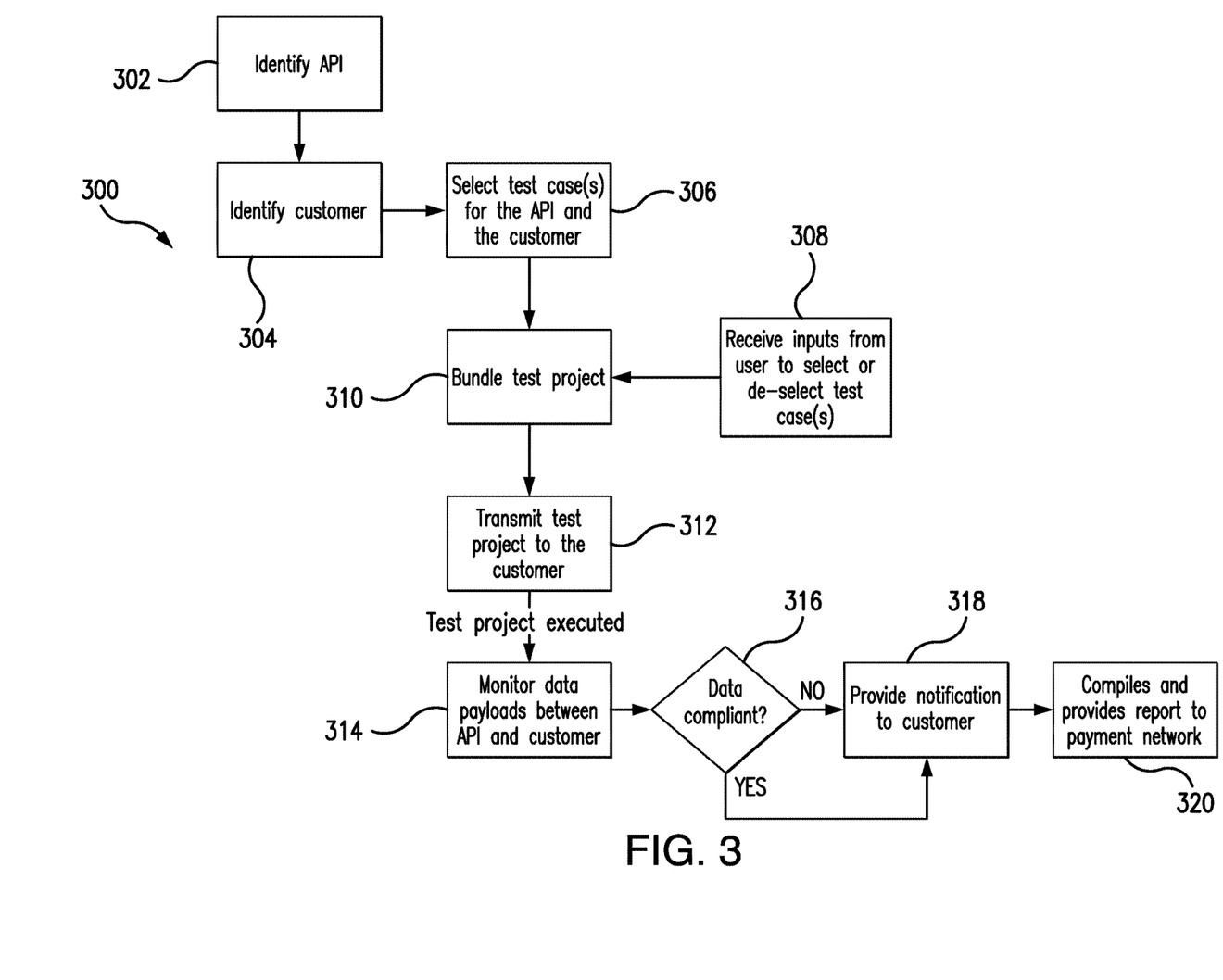
FIG. 3 is an exemplary method for use in certifying interactions with a hosted service, and which can be implemented via the system of FIG. 1.

FIG. 3 illustrates an exemplary method 300 for validating interactions between one or more APIs and one or more customers. The exemplary method 300 is described (with reference to FIG. 1) as implemented in the certification engine 116 of the payment network 102, in connection with actions by the customer 106, the user 112 and the user 114 (in the system 100), and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

In the method 300 (and without limitation), the customer 106 has developed and/or modified a tool for use by the customer 106, which relies on at least one service of the API 110a. As such, the customer 106 may request use of the API 110a from the payment network 102. In response in the method 300, the payment network 102 requires the customer 106 to be certified for use of the API 110a. In an attempt to achieve certification, from the payment network 102, for use of the API 110a, the customer 106 initially sets up a test environment, which provides intended interactions of the tool with the API 110a.

Thereafter, upon the request for such certification, the user 112 associated with the payment network 102 selects and/or identifies the API 110a, at 302, and identifies the customer 106, at 304. Specifically, an interface may be displayed to the user 112, at the computing device 200, by the certification engine 116, which permits the selection of the API 110a and the identification of the customer 106. The interface may include, for example, a webpage or other network-based interface provided from the certification engine 116. The user 112 may be permitted to select the API 110a, for example, from a dropdown menu of available APIs, or to select the API 110a through typing or otherwise inputting an identifier associated with the API 110a (e.g., a name of the API 110a, etc.). In this manner, the certification engine 116 may permit the user 112 to select only a valid and/or known API. Likewise, the customer 106 may be identified, by the user 112, from a dropdown menu, or by entry of a name or other identifier associated with and unique to the customer 106. Again, in this manner, the certification engine 116 may permit the user 112 to identify only a valid and/or known customer. If either the API 110a or the customer 106 is unknown, the certification engine 116 may display one or more different interfaces to register the API 110a or the customer 106 to the certification engine 116, whereby the user 112 would enter detail related to the API 110a and/or the customer 106 to permit the certification engine 116 to operate as described herein.

Once the API 110a is selected and the customer 106 is identified, the certification engine selects, at 306, one or more test cases for a test project for the API 110a and the customer 106. The test cases may include, for example, any of Test Case Nos. 1-9 referenced in Table 2, etc.

In addition, via another interface provided by the certification engine 116 to the computing device 200, the user 112 may select additional test cases for the test project, or de-select desired test cases presented by the certification engine 116, at 308 (e.g., where the certification engine 116 selects Test Case Nos. 4-9 referenced in Table 2, the user 112 may select Test Cases No. 1-3 and de-select Test Case Nos. 5-6 referenced in Table 2; etc.). In connection therewith, the user 112 is able to provide inputs to the certification engine 116 for particular test cases and thereby customize the test project for the customer 106 (e.g., based on particular services requested by the customer 106, based on the particular customer 106, etc.). As another example, when the service requested by the customer 106 via the API 110a relates to cloud-based payment (e.g., Mastercard CBP (MCBP), etc.) applications, the certification engine 116 may select fifteen test cases (at 306) based generally on the identified API 110a. Thereafter, the user 112 may de-select one or more of the fifteen test cases based on, for example, the customer 106, a specified use of the API 110a by the customer 106 for the MCBP applications, a limitation on the use of the API 110a for the customer 106, etc. and/or further select additional test cases to add thereto for the same or different reasons.

Subsequently in the method 300, the certification engine 116 bundles, at 310, the selected test cases into the test project, taking into account any de-selected test cases, and transmits the test project to the customer 106, at 312. For example, the certification engine 116 may bundle and store the test project as specific to the API 110a and the customer 106 in memory (e.g., the memory 204, etc.) at the payment network 102. In turn, the certification engine 116 then transmits the test project to the customer 106 (and more particularly to the user 114), for example, as a link in an electronic message (e.g., an email message, an SMS message, etc.). With that said, when the customer 104 is involved in being certified to the API 110a, with the certification engine 116 deployed at least partially at the customer 106, the certification engine 116 operates in generally the same manner as above. However, in this implementation, the customer 104 then stores the test project in memory (e.g., the memory 204, etc.) at the customer 104.

In any case, when the customer 106 is ready to test and/or attempt to certify its interactions with the API 110a, the customer 106 selects the test project (e.g., selects the link to the test project, etc.) and executes the test project in accordance with the bundled test cases. With the execution of the test project, the certification engine 116 monitors, at 314, the data payloads (or data flows) exchanged between the API 110a and the customer 106 (consistent with the monitoring process described above). As the exchanged data payloads are monitored (e.g., from associated logs, data traffic, etc.), the certification engine 116 determines, at 316, for each payload or at one or more intervals, whether the data is associated with a bundled test case(s) and, if so, whether it is consistent with an expectancy for the test case(s) associated with API 110a. Specifically, the certification engine 116 evaluates a payload of data passed from the customer 106 to the API 110a (e.g., in a log associated with the API 110a, etc.) to determine if one or more parameters therein are associated with a bundled test case(s), and if so, whether the parameters are consistent with the specification for the API 110a (e.g., as shown in Table 3 for the Money Send API, etc.).

In addition, as part of such testing, the certification engine 116 also determines, for each payload of data passing back to the customer 106 from the API 110a, whether the data includes a result(s) associated with a bundled test case(s) and, if so, whether it is consistent with an expectancy for a test case result(s) associated with the test case(s) for the API 110a. Specifically, the certification engine 116 evaluates a payload of data passed from the API 110a to the customer 106 to determine if one or more results therein are associated with a bundled test case(s), and if so, whether the results are consistent with the expected test case result(s) for the associated test case(s) (e.g., as shown in Table 2 for Test Case Nos. 1-9 for the Money Send API, etc.). It should be appreciated that the determination of each payload relative to parameters associated with the specification (and the test case) and/or expected result associated with the test case may vary depending on the test project (and test cases for that project) and API. Additional manual review, apart from the certification engine 116, or through modification of the test cases and/or test project in the certification engine 116, may also be required in certain test projects for certain APIs, or not.

When the certification engine 116 determines that the data is consistent with the expectancy for the API 110a, or not, the certification engine 116 provides appropriate notifications to the customer 106, at 318. For example, the customer 106, and specifically the user 114, may execute the test project through an interface provided from the certification engine 116 (e.g., a network-based interface, etc.), whereby the certification engine 116 is able to provide data to the interface, in real time or near real time, thereby giving the customer 106 specific and prompt feedback about its performance in interacting with the API 110a. If, for example, a format of a data payload is incorrect, after that data payload is received by the certification engine 116 (as part of the monitoring), the certification engine 116 may provide a notification to the customer 106 of the incorrect payload as known to the user 114, through the interface, for example, as a warning, a log entry, or other visual or audible cue, again in real time or near real time.

FIG. 4 illustrates an exemplary interface 400 including a dashboard that may be displayed, by the certification engine 116, to the customer 106 (e.g., to the user 114 at computing device 200, etc.) in connection with providing notifications to the customer 106 with regard to a test project and in connection with different interactions between the customer 106 and one or more APIs. As shown, the interface 400 includes a status segment 402 that relates to the test project, which includes a name of the test project (i.e., CIS-2017-#####); a project status (i.e., In Progress); an API name (i.e., Money Send); a status of test cases for the test project including a number passed, a number failed, and a number not tested; and various notifications about the test project. In connection therewith, the interface 400 identifies activity for the given day, including a listing of successful test cases, failed test cases, and connection times, etc. Further in the interface 400, the user 114 is able to amend notes, whereby different users on a test project may communicate and/or document actions items or other updates and/or tasks related to the test project.

In addition, the interface 400 includes a user segment 404 specific to the user 114 (e.g., identified as Mike Smith having a User ID of MS@customer.com, etc.) and test projects associated with and/or accessible to the user 114 (e.g., CIS-2017-56789, CIS-2017-123456, etc.). Upon selection of the different test projects, the status segment 402 (described above) is repopulated with the information specific to the selected test project, thereby allowing the user 114 to navigate between the test projects. Further, the interface 400 includes segments 406 and 408 for the creation of new test projects, through which the user 114 is able to interact with the payment network 102 (as appropriate) and create new test projects by selecting, for example, the "Create Project" button 410. In response to selecting button 410, the certification engine 116 populates the segment 408 with options to be selected and/or entered for the new test project. It should be appreciated that despite the exemplary format, arrangement and appearance of the interface 400, other interfaces, messages, and/or formats may be employed in other embodiments to provide notifications and/or other information related to a test project and/or API to one or more users.

Referring again to FIG. 3, finally, when the test case(s), or the test project, is complete, the certification engine 116 compiles and provides a report, at 320, to the user 112, or more generally, to the payment network 102. When the interactions between the API 110*a* and the customer 106 have satisfied the expectancy for the API 110*a*, the report may be a certification of the customer 106 for use of the API 110*a*, or may be used, by the user 112, to make a determination of certification for the same. If, however, the report shows inconsistency or incorrect data payloads, the report may be used, by the user 112, to direct correction by the customer 106 and/or deny certification until the test project is able to be executed without any notifications of inconsistency and/or incorrect data payloads.

In view of the above, the systems and methods herein provide certification of a customer's use of an API, whereby a certification engine, for example, monitors the data flow (or data payloads) between the customer and the API to determine if corresponding data payloads are compliant with one or more standards associated with the API, based on test cases associated with a test project. In this manner, when the payloads from the customer (or to the customer) include all required API data, parameters, and/or fields populated, and expected results, the customer may be certified to use the API, generally, without potentially evaluating the content of the data payloads. The systems and methods herein may further provide real time or near real time feedback to the customer and/or the API host (e.g., the payment network, etc.) through a dashboard interface, appropriate notifications, etc., thereby promoting efficiencies in the validation and/or certification of the customer for the API. As such, API hosts may provide consistent and efficient certification of the customer for use of the API.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) selecting an API, the API defining at least one service to be used by a customer and a standard associated with the API for data payloads directed to the API; (b) identifying the customer; (c) selecting, by at least one computing device, at least one test case for the API and the customer; (d) bundling, by the at least one computing device, the at least one test case into a test project for the customer; (e) transmitting, by the at least one computing device, the test project to the customer, whereby the customer is able to execute the test project; (f) monitoring, by the at least one computing device, data payloads between the API and the customer; and (g) compiling and transmitting, by the at least one computing device, a report indicative of a result of the at least one test case, the report indicating whether the data payloads are compliant with the standard associated with the API, thereby indicating certification of the customer's use of the API to provide the at least one service, or not.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in validating customer use of one or more application programing interfaces (APIs), the method comprising:
   receiving a request from a customer computing device associated with a customer relating to use of an API hosted by an API computing device, the API defining at least one service to be used by the customer and a standard associated with the API for data payloads directed to the API computing device, wherein the API computing device is separate from the customer computing device;
   selecting the API from multiple different APIs and identifying the customer;
   automatically selecting, by at least one computing device, at least one test case specific to the selected API for the identified customer;
   bundling, by the at least one computing device, the at least one test case into a test project for the customer;
   transmitting, by the at least one computing device, the test project to the customer computing device, whereby the customer computing device executes the test project on the selected API, via the API computing device, wherein the at least one computing device is separate from the customer computing device and the API computing device;
   after transmitting the test project to the customer computing device, monitoring, by the at least one computing device, data payloads between the API computing device and the customer computing device; and
   compiling and transmitting, by the at least one computing device, a report indicative of a result of the at least one test case based on the monitored data payloads, the report indicating whether the monitored data payloads are compliant with the standard associated with the selected API, thereby indicating certification of the customer's use of the selected API to provide the at least one service, or not.

2. The computer-implemented method of claim 1, wherein selecting the at least one test case includes selecting a plurality of test cases for the API and the customer.

3. The computer-implemented method of claim 1, wherein transmitting the test project to the customer computing device includes transmitting an electronic message including a link to the test project to the customer computing device.

4. The computer-implemented method of claim 1, further comprising providing a notification to the customer computing device regarding a status of the test project, via a dashboard interface available to the customer at the customer computing device.

5. The computer-implemented method of claim 4, wherein providing the notification includes providing the notification in real time, or near real time.

6. The computer-implemented method of claim 1, wherein the at least one test case includes multiple test cases; and
   wherein the method further includes de-selecting one or more of the multiple test cases in response to an input from a user at the at least one computing device.

7. The computer-implemented method of claim 1, further comprising executing the test project in response to an input from the customer;
   identifying ones of the monitored data payloads consistent with the at least one test case; and
   determining whether the identified ones of the monitored data payloads are compliant with the standard associated with the API.

8. The computer-implemented method of claim 1, wherein the customer includes a banking institution;
   wherein the API is hosted by a payment network; and
   wherein the at least one service relates to payment account transactions.

9. The computer-implemented method of claim 1, further comprising validating use of the selected API by the customer based on the monitored data payloads including results that are consistent with expected test case results.

10. The computer-implemented method of claim 1, wherein monitoring the data payloads between the API and the customer computing device includes monitoring the data payloads based on a log for the API in real time, or near-real time.

11. The computer-implemented method of claim 1, wherein monitoring the data payloads between the API and the customer computing device includes monitoring the data payloads based on the data passing through the computing device in real time.

12. A non-transitory computer-readable storage media including executable instructions for validating customer use of one or more application programming interfaces (APIs), which when executed by at least one processor, cause the at least one processor to:
   bundle multiple test cases into a test project for a customer computing device of a customer for an API hosted by an API computing device, in response to a request by the customer for services specific to the API, wherein the customer computing device is separate from the at least one processor and the API computing device;
   in response to execution of at least one of the multiple test cases by the customer computing device, monitor data payloads between the API computing device and the customer computing device;
   determine whether each data payload from the customer computing device to the API computing device conforms to a specification associated with the API, whereby the customer is able to be certified to the API when each data payload conforms to the specification; and
   generate and transmit a notification when a data payload from the customer computing device fails to conform to a standard specification for the API.

13. The non-transitory computer-readable storage media of claim 12, wherein the executable instructions, when executed by the at least one processor, further cause the at least one processor to select the multiple test cases for the API based on the standard specification for the API.

14. The non-transitory computer-readable storage media of claim 13, wherein the executable instructions, when executed by the at least one processor, further cause the at least one processor to de-select one or more of the multiple test cases in response to an input from a user.

15. The non-transitory computer-readable storage media of claim 12, wherein the executable instructions, when executed by the at least one processor, further cause the at least one processor to provide the notification to a user.

16. The non-transitory computer-readable storage media of claim 12, wherein the executable instructions, when executed by the at least one processor, further cause the at least one processor to transmit the notification to the customer computing device, via a dashboard interface.

17. The non-transitory computer-readable storage media of claim 12, wherein the customer includes a banking institution;
   wherein the API is hosted by a payment network; and
   wherein the at least one of the services specific to the API relates to payment account transactions.

18. A system for use in validating customer use of one or more application programming interfaces (APIs), the system comprising:
   at least one processor configured to:
      bundle multiple test cases into a test project for a customer computing device of a customer for an API hosted by an API computing device, wherein each of the multiple bundled test cases is associated with an expected test case result specific to use of the API, and wherein the customer computing device is separate from the at least one processor and the API computing device;
      in response to execution of at least one of the multiple bundled test cases by the customer computing device, monitor data payloads between the API computing device and the customer computing device;
      determine whether each monitored data payload is associated with one of the multiple bundled cases; and
      when one of the monitored data payloads is associated with one of the multiple bundled test cases, determine whether the one of the monitored data payloads conforms to a specification of the API, based on whether the one of the monitored data payloads includes a result returned from the API that is consistent with the expected test case result associated with the one of the multiple bundled test cases.

19. The system of claim 18, wherein at least one of the multiple bundled test cases is further associated with a parameter for validation; and
   wherein the at least one processor is further configured to:
      when the one of the monitored data payloads is associated with the one of the multiple bundled test cases and the one of the multiple bundled test cases is associated with a parameter for validation, determine whether the one of the monitored data payloads conforms to a specification associated with the API, based on whether the one of the monitored data payloads includes a result returned from the API that is consistent with the expected test case result associated with the one of the multiple bundled test cases; and/or
      when the one of the monitored data payloads is associated with the one of the multiple bundled test cases and the one of the multiple bundled test cases is associated with a parameter for validation, determine whether the one of the monitored data payloads conforms to a specification associated with the API, based on whether the one of the monitored data payloads includes a parameter to the API that is consistent with the parameter for validation associated with the one of the multiple bundled test cases.

20. The system of claim 18, wherein the at least one processor is configured to bundle the multiple test cases into the test project for the customer computing device for the API based on input from a user; and
   wherein the input includes at least one of: the user selecting at least one of the multiple test cases, the user de-selecting at least one test case, and the user providing at least one of the multiple test cases.

\* \* \* \* \*